3,014,010
METHOD OF MAKING CROSS-LINKED
VISCOUS RESINS
Otto Grosskinsky and Walter Thurauf, both of Deutsche-Strasse 26, Dortmund-Eving, Germany
No Drawing. Filed Sept. 24, 1956, Ser. No. 611,759
Claims priority, application Germany Dec. 9, 1955
4 Claims. (Cl. 260—75)

This invention relates to artificial resins and methods of preparing the same.

It is known to prepare artificial resins of excellent properties which are particularly suitable for being worked up to lacquers, e.g. films of remarkable luster, high hardness and elasticity, by esterifying tri- and polybasic benzene carboxylic acids with polyvalent alcohols, such as butylene glycol. However, the preparation of such resins involves difficulties inasmuch as completely insoluble and, accordingly useless products are readily formed during the esterification, said insolubility being substantially due to a premature hardening (gelatinization) of the reaction product, said hardening being avoidable only by discontinuing the esterification at an early stage. Nevertheless, in many cases a partial hardening occurs, with the result that losses of starting material ensue. Such soluble resins as are obtained by a timely discontinuation of the esterification, have a comparatively high acid number, their utility being limited accordingly.

We have discovered that the aforesaid gelatinization can be avoided, and excellent, well cross-linked resins are obtained by first completely or partially esterifying the tri- and polybasic benzene carboxylic acids with monovalent alcohols and subsequently interchanging the ester radicals by means of polyvalent alcohols by continuously separating the liberated monovalent alcohol and any liberated water. Surprisingly it has been found that the esterification of the aforesaid carboxylic acids when carried out by ester interchange, as stated above, proceeds smoothly and without displaying the very pronounced gelatinizing tendency of the esters of polyvalent alcohols, to yield well cross-linked, practically neutral and readily soluble resins. Due to their neutrality, such resins are eminently suitable for use as protective coatings such as stoving lacquers.

The production of the resins can be carried out e.g. by converting esters of monovalent alcohols into more or less viscous products or low molecular and high molecular neutral resins, respectively, of different properties, this being achieved by a partial ester interchange by means of polyvalent alcohols. Moreover, such ester interchange may be completed in stoving, should the resins be employed as stoving lacquers.

The ester interchange, when applied to acid esters of monovalent alcohols, results also in strongly cross-linked resins of low or high viscosity in case of the esterification of the free carboxy groups of the acid being combined with a partial ester interchange applied to the carboxy groups blocked by the monovalent alcohol radicals. This interchange of ester radicals proceeds also without a gelatinization unless excessively strongly acid esters of the monovalent alcohols are worked up. When starting with a benzene-tri-carboxylic acid, the esterification is carried out with a sufficient quantity of monovalent alcohol that at least a di-ester results; when using a tetracarboxylic acid as the starting material, it should first be transformed at least into the di-ester, if not the tri-ester of the monovalent alcohol. The subsequent interchange of the ester radicals yields strongly cross-linked resins in the absence of any gelatinization, which resins, though not completely neutral, have very low acid numbers. These resins too are eminently suitable for use as stoving lacquers, in combination with other resinous substances, for use as protective coatings.

The invention contemplates the use of such monovalent alcohols as methanol, ethanol, propanol butanol, and such polyvalent alcohols as ethylene glycol, propylene glycol, butylene glycols, hexanediols, glycerin; in addition, fatty acid partial esters of glycerine etc. are suitable.

Among the benzene polycarboxylic acids and their anhydrides, pyromellitic acid and its anhydride are preferred as this acid component results in particularly hard and yet highly elastic resins. When trying, for example, to react pyromellitic acid with a polyvalent alcohol, such as ethylene glycol, in the usual manner, and heating the reaction mixture to the reaction temperature required (about 180° C.), a thoroughly undesirable gelatinization occurs, resulting in a worthless product. However, when starting, according to the present invention, from a half-ester formed by combining a monovalent alcohol with pyromellitic acid, there is obtained, without any gelatinization a strongly cross-linked product the acid number of which is very small. In this case the carboxylic groups are esterified and simultaneously the half-ester undergoes a partial ester interchange whereby the monovalent alcohol is split off. The resulting resin, when dissolved in a butanol-toluene mixture, yields a very hard but elastic stoving lacquer.

In a manner analogous to the esterification of the pyromellitic acid, other carboxylic acids may be subjected to esterification and ester interchange according to known methods. The reactions may be carried out also at elevated or at lowered pressures, or continuously or in batches, and in the presence of catalysts, diluents and floating agents.

In addition, it has been found that resins which are even polymerizable and susceptible of hardening below 100° C., are obtained by the condensation of unsaturated dibasic carboxylic acids. Readily hardenable coating lacquers and casting resins suitable for the production of various household and similar articles, are thus obtained.

The condensation of the unsaturated carboxylic acids can be effected in various manners, subsequent to the esterification of the polybasic benzene carboxylic acids with the respective monovalent alcohol, and dependent on the method employed, a variety of products with varying characteristics are thus obtained. According to the simplest method, the ester resulting from a monovalent alcohol and a tri- or polybasic carboxylic acid is mixed, at the same time, with a polyvalent alcohol and an unsaturated carboxylic acid. More favorable properties, in many respects, shows a resin prepared according to the present invention which results either from a preliminary esterification of the unsaturated dibasic acid with an excess of a polyvalent alcohol, or a preliminary esterification of the polybasic carboxylic acid, subsequent to its esterification with the monovalent alcohol, with an excess of a polyvalent alcohol and the subsequent reaction of such esters containing still hydroxy groups, with any remaining carboxylic acid. Thus, for example, the di-$\beta$-hydroxy ethyl ester may be prepared first by esterifying the unsaturated dibasic maleic acid with an excess of ethylene glycol, whereupon the aforesaid ester is reacted with the other reactants. Inversely, the tri- or polybasic carboxylic acid, such as pyromellitic acid, is reacted with an excess of ethylene glycol, subsequent to its esterification with a monovalent alcohol, yielding an ester containing hydroxy groups which is then reacted with a dibasic acid. The dibasic acids may be replaced by their esters which are obtained by reacting an excess of polyvalent alcohol with the dibasic acid, an example being the ethylene glycol di-maleic-acid ester obtained by reaction of 1 mol ethylene glycol with 2 mols maleic acid anhydride.

In addition to unsaturated dibasic carboxylic acids, saturated dibasic acids are also suitable, the latter, however, yielding no polymerizable resins.

The invention prefers to use the following dibasic acids: oxalic acid, malonic acid, succinic acid, glutaric acid, adipic acid, pimelic acid, sebacic acid, maleic acid, fumaric acid, citraconic acid, itaconic acid, phthalic acids. Such acids may be used also in the form of mixtures, the same as the mono- and polyvalent alcohols and the benzene polycarboxylic acids.

The specific effect of the unsaturated acids or their anhydrides, is due to the aggregation of their double bonds which in touch results from the combined resinification with the tri- or polybasic benzene carboxylic acids and the intense cross-linkage occasioned thereby. The additional incorporation of unsaturated dibasic carboxylic acids results in forming—together with the tri- and polybasic carboxylic acids—complex molecules of particularly strong polymerizing tendency. The amounts of the dibasic carboxylic acids added may vary between 5 and 30 percent by weight of the end product.

The process according to the invention yields a substantially complete conversion of the polyvalent alcohols and the tri- or polyvalent benzene carboxylic acids, which means that neutral esters are obtained without any necessity of employing an excess of polyvalent alcohols. Thus, the resins ultimately obtained have no hydroxy and carboxy groups, are consequently strongly cross-linked and thus have a very material industrial importance.

If, on the contrary, neutral esters were to be produced by direct esterification of the tri- or polyvalent benzene carboxylic acids in the presence of much excess of polyvalent alcohols, only weakly cross-linked products are obtained, since in this case, a great number of alcohol molecules are only converted with one hydroxy group so the desired cross-linking does not occur.

The novel resins are readily soluble in the customary solvents, the excellent solvent characteristics being explained by the residue of monovalent alcohol which invariably remains in the end product. If the resins are to be used as casting resins, solvents to be employed should be susceptible of forming copolymers with the resins; suitable solvents are of the well known vinyl type, such as styrol, vinyl acetate, acrylic acid esters and the like. In order to carry out the polymerization at the lowest possible temperatures, peroxides are added to such resin solutions; benzoyl peroxide, dilauroyl peroxide, cyclohexane peroxide or similar polymerizing agents are suitable for this purpose.

The invention may be further explained by the following examples which are incorporated in this specification for the purpose of illustration rather than limitation. Parts are by weight unless otherwise noted.

*Example I*

A mixture of 200 parts of pyromellitic acid anhydride and 1000 parts of methanol, is heated in an autoclave to 200° C. during 10 hours. The excess methanol is distilled off. A substantially neutral ester of the pyromellitic acid is obtained.

775 parts of the tetramethyl ester of pyromellitic acid thus obtained are mixed with 297 parts of 1,6-hexanediol. The mixture is heated to 190–200° C. and maintained at this temperature for about 9 hours. The methanol split off is continuously distilled off.

A highly viscous resin is obtained which is soluble in a mixture of butanol and toluene (1:1). The solution is applied, as a coat, on an iron sheet and stoved at a temperature of 180° C., subsequent to the evaporation of the solvent. A high-luster, hard and elastic coat of lacquer is thus formed.

*Example II*

678 parts of a mixture (of equal parts) of a mellophanic- and benzene pentacarboxylic-acid-methyl-ester, obtained by esterification of the respective acids with methanol according to Example I, are mixed with 124 parts of ethylene glycol. The mixture is heated to 190–200° C. and kept at this temperature for 9 hours. The methyl alcohol split off during the interchange of the ester radicals is continuously distilled off.

A highly viscous resin is obtained which is dissolved in acetone and applied as a coat on blanc sheet iron. Subsequent to the evaporation of the solvent the varnished iron sheet is heated to 190° C. for one hour. A glossy, elastic and hard coat of lacquer remains on the sheet.

*Example III*

218 parts of pyromellitic acid anhydride are mixed with 148 parts of butanol and heated to 140–160° C. for about one hour. The ester obtained corresponds substantially to the half-ester of pyromellitic acid and shows the acid number 305.

168 parts of this butyl ester and 42.7 parts of ethylene glycol are heated to 190° C. for 9 hours. The water formed and the butyl alcohol liberated are continuously distilled off.

A highly viscous resin results which is dissolved in a mixture of butanol and toluene. The resinous solution is spread on an iron sheet and (once the solvent has evaporated) stoved at a temperature of 180° C. A high-luster, hard and elastic lacquer coat is thus obtained.

*Example IV*

2000 parts of pyromellitic acid are mixed with 3500 parts of butanol, the reaction liquid being continuously distilled off. The mixture is heated to boiling temperature until the butyl ester, after evaporation of the butanol, shows the acid number 130. This takes about 4 hours.

A mixture of 180 parts of this acidified pyromellitic acid butylester and 32.7 parts of glycerine is heated to a temperature of 190–200° C. for 7 hours. The butanol-water-mixture separating during the reaction is continuously removed. The highly viscous product obtained is dissolved in a mixture of butanol-toluene (1:1), brushed upon blanc sheet iron and stoved at 200° C. for 1½ hours, following the evaporation of the solvent. A high-gloss, elastic, hard lacquer film remains.

*Example VI*

1000 parts of pyromellitic acid are mixed with 1300 parts of butanol and heated to boiling temperature, the water formed being continuously distilled off, until the acid number of the partial ester obtained, after the evaporation of the excess of butanol, is 290.

366 parts of this acid butyl ester of pyromellitic acid and 204 parts of di-β-hydroxy-ethyl-maleate are heated for 6–7 hours in a nitrogen current to 180–210° C. under stirring. The mixture of butanol and water separated in consequence, is continuously distilled off and collected in a receiver.

Following the reaction the highly viscous esterification product is mixed with 30 percent of its weight of styrol, 1.5 percent of benzoyl peroxide and 0.5 percent of cobalt naphthenate, cast in a mold and maintained at about 80–100° C. for 24 hours. A light yellow resin of excellent mechanical properties is thus obtained.

*Example VII*

346 parts of the acid butyl ester of pyromellitic acid (acid number 290) obtained according to Example VI and 600 parts of ethylene glycol are heated for 8–9 hours to 190–200° C., the mixture of butanol and water separating in the course of this procedure being continuously distilled off. Thereafter, the excess of ethylene glycol is distilled off in the vacuum (20 mm. Hg). The remaining butyl-β-hydroxy-ethylester of pyromellitic acid, is mixed with 116 parts of maleic anhydride and the mixture heated for 6–7 hours to 190–230° C. in a current of nitrogen, the mixture of butanol and water split off during the reaction being continuously distilled off and collected in a receiver. The last traces of volatile constituents are removed by vacuum distillation (20 mm. Hg).

The highly viscous product obtained is mixed with 30 percent of its weight of styrol, 1.5 percent of benzoyl peroxide and 0.5 percent of cobalt naphthenate, poured into a mold and hardened for 24 hours at 80–100° C., whereby a clear, light yellow resin of excellent mechanical properties is obtained.

*Example VIII*

280 parts of trimellitic acid are mixed with 1480 parts of butanol and heated to boiling temperature, the reaction water being continuously distilled off, until the ester obtained shows the acid number 190.

322 parts of this acid butyl ester of the trimellitic acid are heated together with 61 parts of glycerin to a temperature of 190–200° C. for 6 hours. The mixture of butanol and water being formed during the reaction is continuously distilled off.

The highly viscous resin obtained is dissolved in a mixture of butanol-toluene (1:1). The lacquer solution is brushed upon blanc sheet iron and stoved at 200° C. for one hour, following evaporation of the solvent. A high-gloss, elastic, hard lacquer coating remains on the iron sheet.

We wish it to be understood that various changes within the scope of the following claims may be made in the details of the processes and products herein disclosed, without departing from the spirit of the invention or sacrificing any advantages thereof.

We claim:
1. A process of producing cross-linked resins comprising esterifying aromatic polycarboxylic acids and anhydrides selected from the group consisting of tri-basic benzene carboxylic acid, tetra-basic benzene carboxylic acid, penta-basic benzene carboxylic acid and the anhydrides thereof with at least two moles of aliphatic monohydric alcohol having from 1–4 carbon atoms by heating to at least 140° C. for at least one hour and forming crude monohydric alcohol di-ester of said aromatic carboxylic acid, thereafter reacting said crude monohydric alcohol di-ester with polyhydric alcohol in a weight ratio of about 2.5 to about 5.6 parts by weight of said crude di-ester to 1 part of said polyhydric alcohol at a temperature of at least about 180° C. for at least six hours; simultaneously distilling off monohydric alcohol and water split off from the reaction to interchange said polyhydric alcohol for monohydric alcohol of the crude ester and thereby provide cross-linked polyhydric alcohol ester of said aromatic polycarboxylic acid.

2. A process as claimed in claim 1 wherein said aromatic polycarboxylic acid is mixed with an olefinically unsaturated dicarboxylic acid in an amount of from 5 to 30% by weight of the total product and sufficient additional monohydric alcohol is added and is reacted with said unsaturated dicarboxylic acid for complete esterification thereof.

3. A process as claimed in claim 1 wherein the crude monohydric alcohol ester of said aromatic polycarboxylic acid is reacted with di-β-hydroxy ethyl maleate as the polyhydric alcohol reactant in said second esterification step.

4. A cross-linked resin produced by the process of claim 1.

References Cited in the file of this patent

UNITED STATES PATENTS

| | | |
|---|---|---|
| 2,465,319 | Whinfield et al. | Mar. 22, 1949 |
| 2,585,323 | Elwell et al. | Feb. 12, 1952 |

FOREIGN PATENTS

| | | |
|---|---|---|
| 881,823 | France | May 10, 1943 |

OTHER REFERENCES

Hackh's Chemical Dictionary (Grant), 3rd Ed., p. 552, pub. 1944, by McGraw-Hill Book Co., Inc., N.Y., New York.

Bennett: Concise Chemical and Technical Dictionary, p. 1051, pub. 1947, Chem. Pub. Co., Inc., Brooklyn, N.Y.